US009473052B2

(12) United States Patent
Sato

(10) Patent No.: US 9,473,052 B2
(45) Date of Patent: Oct. 18, 2016

(54) MOTOR DRIVE METHOD AND MOTOR DRIVE DEVICE

(71) Applicant: Panasonic Corporation, Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 328 days.

(21) Appl. No.: 14/342,824

(22) PCT Filed: Jan. 30, 2013

(86) PCT No.: PCT/JP2013/000475
§ 371 (c)(1),
(2) Date: Mar. 5, 2014

(87) PCT Pub. No.: WO2013/136653
PCT Pub. Date: Sep. 19, 2013

(65) Prior Publication Data
US 2014/0225546 A1 Aug. 14, 2014

(30) Foreign Application Priority Data

Mar. 12, 2012 (JP) ................. 2012-054147

(51) Int. Cl.
| H02P 6/14 | (2016.01) |
| H02P 6/08 | (2016.01) |
| H02P 6/10 | (2006.01) |
| H01M 10/625 | (2014.01) |
| H01M 10/6563 | (2014.01) |
| H01M 10/613 | (2014.01) |

(52) U.S. Cl.
CPC . *H02P 6/08* (2013.01); *H02P 6/10* (2013.01); *H02P 6/153* (2016.02); *H02P 6/17* (2016.02); *H01M 10/613* (2015.04); *H01M 10/625* (2015.04); *H01M 10/6563* (2015.04)

(58) Field of Classification Search
CPC .................................. H02P 6/10; H02P 6/08
USPC .................................................. 318/400.26
See application file for complete search history.

(56) References Cited

U.S. PATENT DOCUMENTS

| 5,296,787 A | 3/1994 | Albrecht et al. |
| 6,064,633 A | 5/2000 | Kuwayama et al. |
| 2011/0254483 A1 | 10/2011 | Chen et al. |
| 2013/0169206 A1 | 7/2013 | Suhama et al. |

FOREIGN PATENT DOCUMENTS

| CN | 1204838 A | 1/1999 |
| DE | 4026366 | 3/1992 |
| DE | 102010034940 | 4/2011 |
| EP | 1198059 | 4/2002 |
| JP | 10-75597 A | 3/1998 |
| JP | 2002-325477 A | 11/2002 |
| JP | 2005-110363 A | 4/2005 |
| WO | WO 2011/155013 A1 | 12/2011 |

OTHER PUBLICATIONS

The Extended European Search Report dated Feb. 9, 2015 for the related European Patent Application No. 13761733.8.
International Search Report for PCT/JP2013/000475, May 7, 2013.
English Translation of Chinese Search Report dated Nov. 13, 2015 for the related Chinese Patent Application No. 201380003216.7.

*Primary Examiner* — Erick Glass
(74) *Attorney, Agent, or Firm* — RatnerPrestia

(57) ABSTRACT

A motor drive method of the invention is to drive a brushless motor having a rotor, a stator, and a hall element used as a position detecting sensor. While driving the brushless motor, when executing a correction process for a rotation speed of the rotor, the correction process is skipped for a predetermined number of times according to a position detection signal.

10 Claims, 7 Drawing Sheets

FIG. 5

| Number of skips Ns | Vibration frequency by correction process fv(Hz) |
|---|---|
| 0 | (10×3)/ (1+0)×600/60=300 |
| 1 | (10×3)/ (1+1)×600/60=150 |
| 2 | (10×3)/ (1+2)×600/60=100 |
| 3 | (10×3)/ (1+3)×600/60=75 |
| 4 | (10×3)/ (1+4)×600/60=60 |
| 5 | (10×3)/ (1+5)×600/60=50 |
| 6 | (10×3)/ (1+6)×600/60=42.86 |
| 7 | (10×3)/ (1+7)×600/60=37.50 |
| 8 | (10×3)/ (1+8)×600/60=33.33 |
| 9 | (10×3)/ (1+9)×600/60=30 |
| 10 | (10×3)/ (1+10)×600/60=27.27 |
| 11 | (10×3)/ (1+11)×600/60=25 |
| 12 | (10×3)/ (1+12)×600/60=23.08 |
| 13 | (10×3)/ (1+13)×600/60=21.43 |
| 14 | (10×3)/ (1+14)×600/60=20 |
| 15 | (10×3)/ (1+15)×600/60=18.75 |
| 16 | (10×3)/ (1+16)×600/60=17.65 |
| 17 | (10×3)/ (1+17)×600/60=16.67 |
| 18 | (10×3)/ (1+18)×600/60=15.79 |
| 19 | (10×3)/ (1+19)×600/60=15 |
| 20 | (10×3)/ (1+20)×600/60=14.29 |
| 21 | (10×3)/ (1+21)×600/60=13.64 |
| 22 | (10×3)/ (1+22)×600/60=13.04 |
| 23 | (10×3)/ (1+23)×600/60=12.50 |
| 24 | (10×3)/ (1+24)×600/60=12 |
| 25 | (10×3)/ (1+25)×600/60=11.54 |
| 26 | (10×3)/ (1+26)×600/60=11.11 |
| 27 | (10×3)/ (1+27)×600/60=10.71 |
| 28 | (10×3)/ (1+28)×600/60=10.34 |
| 29 | (10×3)/ (1+29)×600/60=10 |

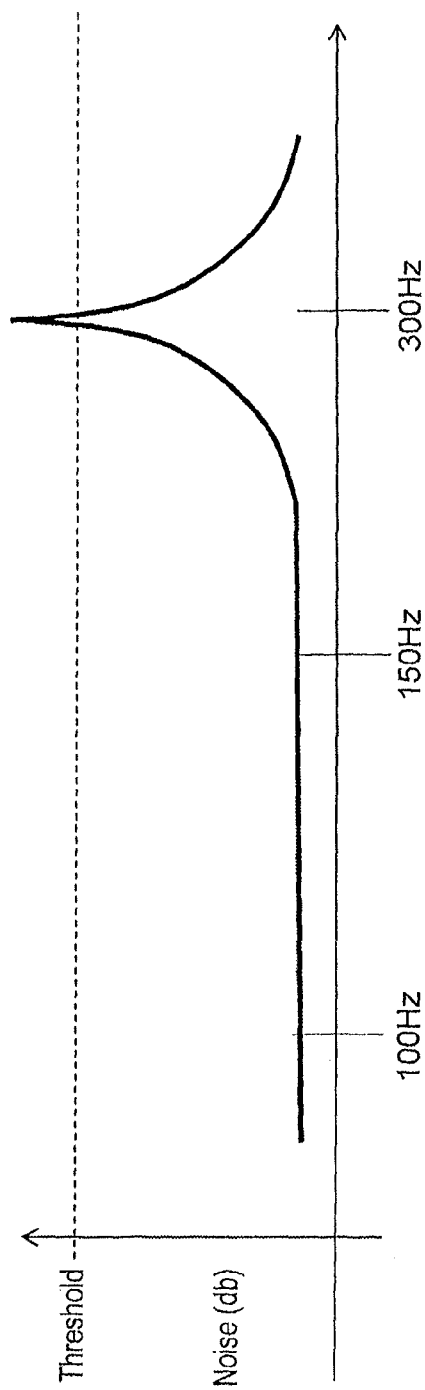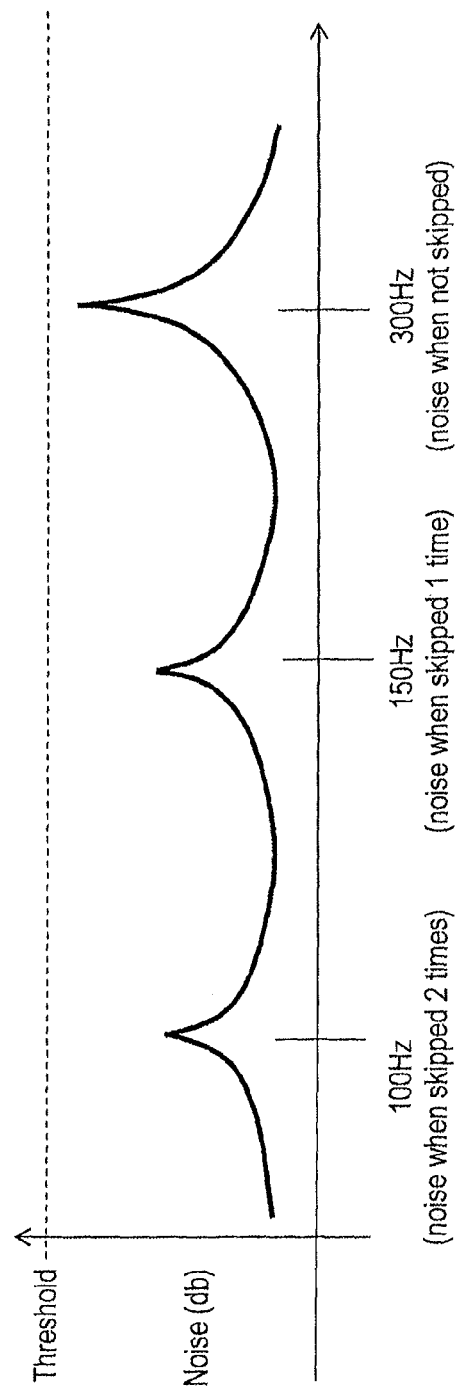

MOTOR DRIVE METHOD AND MOTOR DRIVE DEVICE

This application is a U.S. National Phase Application of PCT International Application PCT/JP2013/000475.

TECHNICAL FIELD

The present invention relates to a motor drive method and a motor drive device capable of reducing rotating sound of a motor.

BACKGROUND ART

Hybrid cars and electric vehicles carry large size batteries to run the vehicle's own bodies. The hybrid cars and electric vehicles are also equipped with air-cooling blowers to cool their electric circuits including the large size batteries. For the air-cooling blowers, a cooling capacity is specified such as an airflow quantity necessary from time to time according to an amount of electric current supplied to an electric circuit, the running condition, and the like of the vehicle. The air-cooling blower needs to be controlled to satisfy the cooling capacity. Variations in the cooling capacity depend on the air-cooling blower. In particular, the variations in the cooling capacity depend largely upon variations in rotation speed of an impeller (bladed wheel).

A motor for driving the air-cooling blower is required to be rotated stably in order to cool the large size battery steadily. The following control method is available, in general, as a technique of driving a motor stably at a target rotation speed. That is, an actual rotation speed of the motor is detected with a position detecting sensor or the like device capable of detecting a rotating position of the motor. The rotation speed of the motor is then controlled in a manner to minimize a difference between detected actual rotation speed of the motor and the target rotation speed of the motor.

In a case of a three-phase brushless motor controlled by pulse-width modulation (hereinafter referred to as "PWM") drive, start timing for driving individual elements to execute the PWM drive is controlled based on outputs of three position detecting sensors composed of hall elements and the like devices. Therefore, the rotation speed of the motor cannot be maintained stably if there is a deviation in the positions where three position detecting sensors are mounted.

To overcome the above problem, patent literature 1 discloses a structure, as one example, that comprises a positional deviation storage means for storing an amount of deviation in position of the rotating position detecting sensor from a proper position of the sensor, as measured beforehand, and a rotating position signal correction means for correcting a rotating position signal of the rotating position detecting sensor according to the amount of positional deviation stored in the positional deviation storage means.

CITATION LIST

Patent Literature

PTL 1: Unexamined Japanese Patent Publication No. 2005-110363

SUMMARY OF THE INVENTION

A brushless motor covered in the present invention comprises a rotor, a stator, and a position detecting sensor.

The rotor includes a rotor shaft, a permanent magnet having N-magnetic poles and S-magnetic poles disposed alternately at regular intervals in a circumferential direction about an axis of the rotor shaft, and a bearing that supports the rotor shaft in a freely rotatable manner about the axis of rotation.

The stator includes a stator core having a plurality of protruding poles, and windings of individual phases wound around the stator core.

The position detecting sensor detects a rotating position of the rotor according to a change in the magnetic polarities produced by the permanent magnet, and outputs a position detection signal.

In a motor drive method of the present invention, a correction process is skipped for a predetermined number of times according to a position detection signal when executing the correction process for correcting a rotation speed of a rotor while driving such a brushless motor.

A motor drive device of the present invention comprises a correction processing section, a switch, a driving-waveform generating section, a PWM circuit and an inverter so as to drive such a brushless motor.

The correction processing section executes a correction process for correcting a rotation speed of a rotor at the timing of receiving input of a position detection signal, and outputs a correction signal that informs execution of the correction process.

The switch is connected between the position detecting sensor and the correction processing section, and makes the correction processing section skip the correction process for a predetermined number of times by thinning out position detection signals input in the correction processing section.

The driving-waveform generating section generates and supplies a waveform signal for driving a winding according to the correction signal.

The PWM circuit generates and supplies a driving pulse signal which is pulse-width modulated by the waveform signal.

The inverter energizes the winding based on the driving pulse signal.

BRIEF DESCRIPTION OF DRAWINGS

FIG. 5 is a performance table showing number of correction processes that are skipped and corresponding vibration frequency resulting from the correction according to first exemplary embodiment of the present invention.

FIG. 7A is a characteristics diagram showing frequency characteristic of noise caused by a correction process for a rotation speed of a brushless motor for the purpose of comparison with first exemplary embodiment of this invention.

FIG. 7B is a characteristics diagram showing frequency characteristic of noise caused by a correction process for a rotation speed of a brushless motor according to first exemplary embodiment of this invention.

DESCRIPTION OF EMBODIMENTS

A motor drive method and a motor drive device in exemplary embodiments of the present invention, some of correction processes for rotation speed of a rotor is skipped, thereby spreading vibration frequencies caused by the correction processes. By spreading the vibration frequencies caused by the correction processes, the invention can reduce a peak level of noise of a specific frequency produced when a motor rotates.

As a result, the invention can improve an audible level to the sound produced by operation of an air-cooling blower driven by the motor. In addition, the invention can be achieved easily with a low-cost circuit e.g. a microcomputer such as a 8 bit microcomputer, since it does not require complex processing to carry out the correction processes.

In other words, conventional motor drive methods have had the following shortcoming to be improved. That is, a start timing of driving an element for carrying out PWM drive is corrected in synchronization with a position signal output from a position detecting sensor. A rotating sound of the motor, or the noise, therefore increases in the specific frequency corresponding to a cyclic period of the correction processes.

The motor drive method and the motor drive device in the exemplary embodiments of this invention are thus aimed at reducing the noise of the specific frequency produced during rotation of the motor with a simple structure, as will be described in a later part.

Description is provided hereinafter of the exemplary embodiments of the present invention by referring to the accompanying drawings.

The embodiments described below are examples that embody the present invention, are not intended to limit the scope of this invention.

First Exemplary Embodiment

Figure 1:
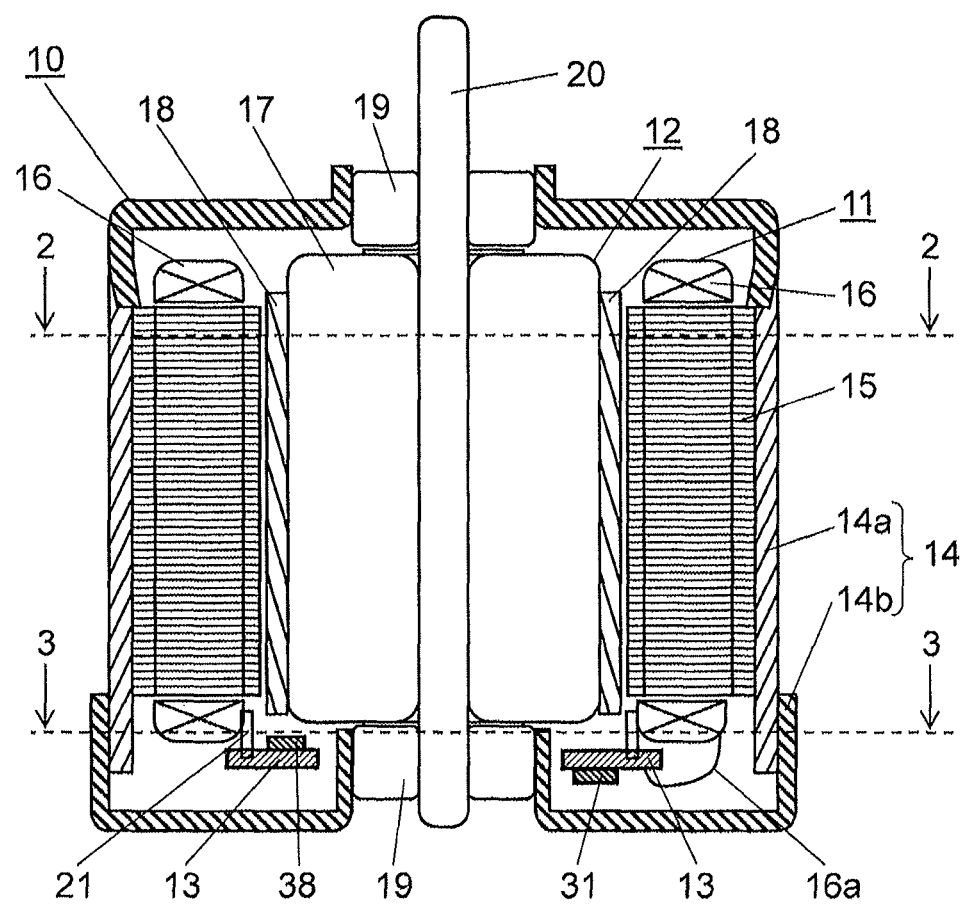
FIG. 1 is a longitudinal sectional view showing a structure of a brushless motor according to first exemplary embodiment of the present invention.

FIG. 1 is a longitudinal sectional view showing a structure of a brushless motor according to the first exemplary embodiment of the present invention. In this exemplary embodiment, description is given of an example of inner-rotor type brushless motor having a rotor disposed rotatably to an interior side of a stator. Brushless motor 10 of this embodiment comprises rotor 12, stator 11, and hall elements 38 used as position detecting sensors.

Rotor 12 includes rotor shaft 20, permanent magnet 18 having N-magnetic poles and S-magnetic poles disposed alternately at regular intervals in a circumferential direction about an axis of rotation of rotor shaft 20, and bearings 19 that support rotor shaft 20 in a, freely rotatable manner about the axis of rotation.

Stator 11 includes stator core 15 having a plurality of protruding poles, and windings 16 for individual phases wound around stator core 15. A pulse-width modulated signal is supplied to each of windings 16 for respective one of phases. As the result, brushless motor 10 of this embodiment rotates by being controlled with PWM drive.

Hall elements 38 functioning as the position detecting sensors detect a rotating position of rotor 12 according to a change in the magnetic polarities of permanent magnet 18, and outputs a position detection signal.

Description is provided in further details. As shown in FIG. 1, brushless motor 10 comprises stator 11, rotor 12, circuit board 13 and motor case 14. Motor case 14 is formed of a metal having a cylindrical shape and a sealed structure. Brushless motor 10 is made up by having stator 11, rotor 12 and circuit board 13 disposed inside motor case 14. Motor case 14 is constructed of case body 14a and case cover 14b. An interior space of motor case 14 becomes generally a sealed condition when case cover 14b is attached to case body 14a.

Stator 11 has windings 16 for individual phases wound around stator core 15, as shown in FIG. 1. Description given as an example in this embodiment is a three-phase brushless motor that demonstrates especially an outstanding performance. Brushless motor 10 of this embodiment has windings 16 for which phases are different by 120 degrees from one another. Windings 16 are separated for three phases, designated individually as U-phase, V-phase and W-phase. Stator core 15 has a plurality of protruding poles that protrude inward. Stator core 15 has an outer peripheral side of generally a cylindrical shape, and the outer periphery of this stator core 15 is fixed to case body 14a.

Rotor 12 is inserted in stator 11 with a gap between them. Rotor 12 holds permanent magnet 18 of a cylindrical shape on an outer periphery of rotor frame 17. Rotor 12 is disposed rotatably around rotor shaft 20 supported by bearings 19. In other words, rotor 12 is so disposed that an outer peripheral surface of permanent magnet 18 confronts end surfaces of the protruding poles of stator core 15.

In addition, this brushless motor 10 has circuit board 13 disposed inside motor case 14, with various circuit components 31 mounted on circuit board 13. These circuit components 31 compose a drive unit for controlling the motor. Additionally, hall elements 38 used as the position detecting sensors are mounted on circuit board 13 for detecting a rotating position of rotor 12. The position detecting sensors may be devices of any kind other than hall elements 38 so long as they can detect a rotating position of rotor 12. Support member 21 is attached to stator core 15. Circuit board 13 is secured within motor case 14 by this support member 21. End portions of individual windings 16 of the U-phase, V-phase and W-phase are tapped out as lead wires 16a from stator 11. One ends of these individual lead wires 16a are connected to circuit board 13.

Brushless motor 10 of such a structure can be constructed in the following steps. First, stator 11 is inserted in case body 14a. Stator 11 is fixed to an inner surface of case body 14a. Next, rotor 12 and circuit board 13 are disposed inside case body 14a. Following the above, case cover 14b is fixed to case body 14a. Brushless motor 10, in which hall elements 38 and the drive unit are built in, is thus composed.

Brushless motor 10 may be of such structure that is integrated with the drive unit. A good shielding effect can be obtained especially when motor case 14 is formed of a metal. Electromagnetic noises radiated to the outside of motor case 14 from circuit board 13, stator 11 and the like can be suppressed by virtue of this shielding effect. In addition, the heat produced by stator 11 can be radiated through metal motor case 14 toward the outside of motor case 14 since stator core 15 is fixed directly to case body 14a.

Figure 2:
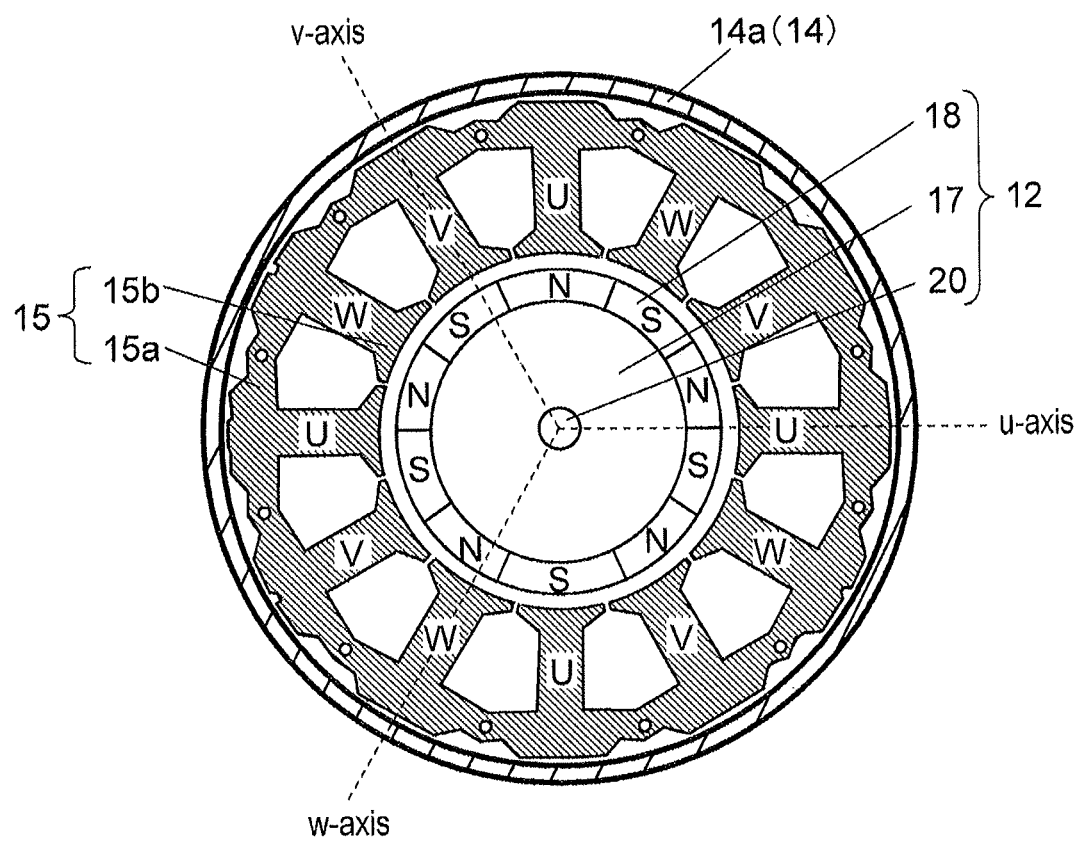
FIG. 2 is a cross-sectional view taken along a line 2-2 of the brushless motor.
Figure 3:
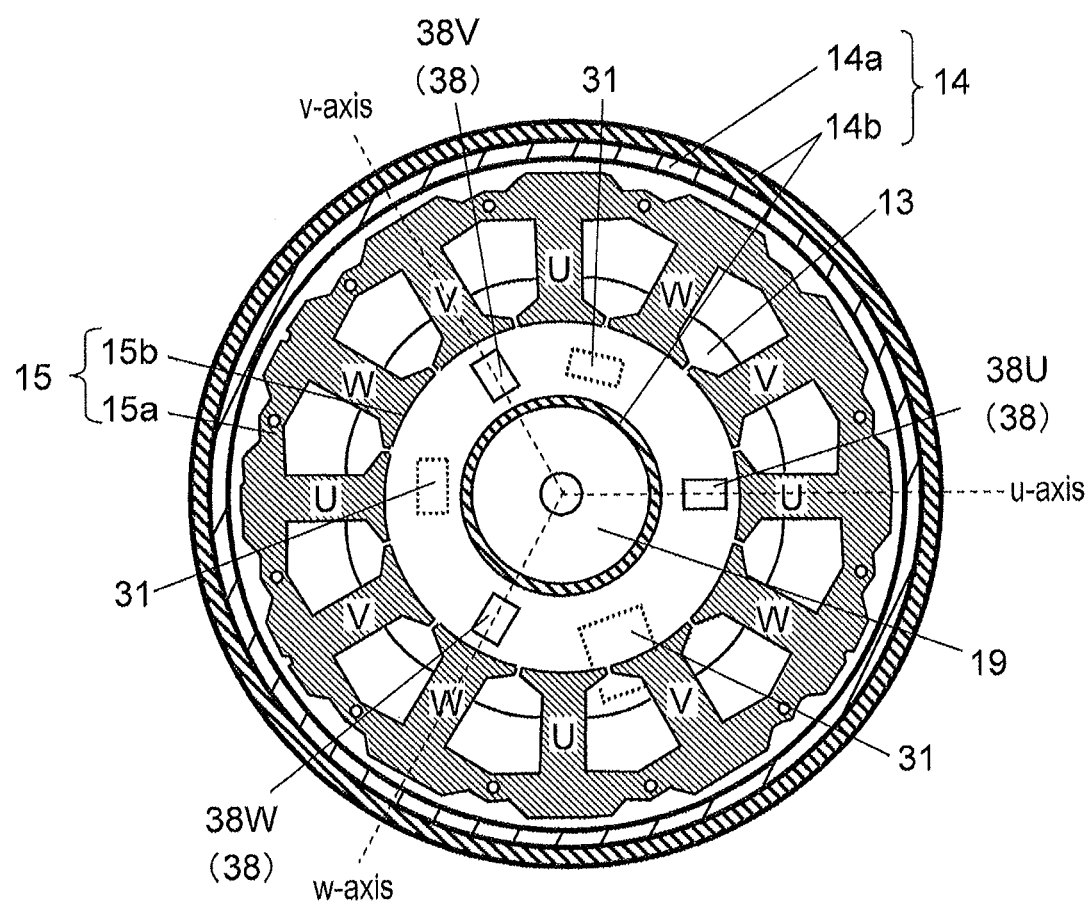
FIG. 3 is cross-sectional view taken along a line 3-3 of the brushless motor.

FIG. 2 is a cross-sectional view taken along a line 2-2 of the brushless motor of this exemplary embodiment shown in FIG. 1. FIG. 3 is another cross-sectional view taken along a line 3-3 of the same brushless motor. FIG. 2 and FIG. 3 show general structures inside motor case 14 of the brushless motor of this exemplary embodiment as observed from the upper side. Here, the structures in FIG. 2 and FIG. 3 illustrate stator core 15 without having windings 16 wound around it as is in FIG. 1. In particular, FIG. 2 shows a positional relation between stator core 15 and permanent magnet 18, and FIG. 3 shows another positional relation between stator core 15 and circuit board 13.

As shown in FIG. 2, stator core 15 comprises ring-shaped yoke 15a and individual teeth 15b as the protruding poles. Stator core 15 illustrated in this embodiment has twelve teeth 15b which form twelve poles in the number of protruding poles. The outer periphery of this stator core 15 is fixed to the inner surface of case body 14a. Individual teeth 15b are extended in a manner to protrude inward. Individual teeth 15b are arranged at regular intervals in a circumferential direction around the axis of rotation of rotor shaft 20 with slots, i.e., spaces, formed between adjoining teeth 15b. Teeth 15b are assigned individually to one of the U-phase, V-phase and W-phase in a sequential manner. A winding of U-phase is wound around tooth 15b of U-phase, a winding of V-phase is wound around tooth 15b of V-phase, and a winding of W-phase is wound around tooth 15b of W-phase.

Rotor 12 is disposed to an interior side of stator core 15 so that it confronts end portions of twelve teeth 15b. Permanent magnet 18 retained by rotor 12 is magnetized so that the S-magnetic poles and the N-magnetic poles are disposed alternately at regular intervals in the circumferential direction about the axis of rotor shaft 20. Permanent magnet 18 in this embodiment has five pairs of the magnetic poles, of which each pair is a combination consisting of S-magnetic pole and N-magnetic pole, along the outer periphery of rotor frame 17 as shown in FIG. 2. That is, permanent magnet 18 is so magnetized as to have ten poles in a number of the magnetic poles along the circumferential direction. As described above, brushless motor 10 has a ten-pole twelve-slot structure.

Next, three hall elements 38U, 38V and 38W are mounted on circuit board 13 together with a variety of circuit components 31, as shown in FIG. 3. Hall elements 38U, 38V, and 38W are so disposed on circuit board 13 that they confront one of end surfaces of the cylindrical permanent magnet. Hall elements 38U, 38V and 38W disposed on circuit board 13 are in such orientations as aligned with extending directions of teeth 15b corresponding to the U-phase, V-phase and W-phase respectively. Owing to this structure, hall elements 38U, 38V and 38W can detect their respective magnetic poles of the permanent magnet corresponding to the U-phase, V-phase and W-phase.

Here, the hall elements may be designated by reference marks 38U, 38V and 38W when they are referred to in relation to the individual phases, or by reference mark 38 when they are referred collectively.

The ten-pole twelve-slot structure of the motor adopted in this exemplary embodiment can provide the following advantage. That is, hall elements 38U, 38V and 38W are disposed at intervals of 120 degrees in mechanical angle. As a result, position detection signals of U-phase, V-phase and W-phase that can be obtained from hall elements 38U, 38V and 38W are the signals of different phases by 120 degrees from one another in electrical angle. In other words, hall element 38U is disposed along the u-axis in a location confronting tooth 15b of U-phase, as shown in FIG. 3. Similarly, hall element 38V is disposed along the v-axis in a location confronting tooth 15b of V-phase, and hall element 38W is disposed along the w-axis in a location confronting tooth 15b of W-phase. According to this structure, hall elements 38U, 38V and 38W are disposed to the locations that are shifted by 120 degrees from one another in the electrical angle with respect to the magnetic poles of permanent magnet 18, as shown in FIG. 2 and FIG. 3. Hall elements 38U, 38V and 38W can thus detect rotating positions of the U-phase, V-phase and W-phase of rotor 12.

A power supply voltage and a control signal are supplied to brushless motor 10 constructed as above from the outside of brushless motor 10. A motor drive device, etc. mounted on circuit board 13 generate driving currents delivered to windings 16 according to the power supply voltage and the control signal supplied to it. A magnetic field is produced from stator core 15 due to the generated driving currents flowing in windings 16. A mutual interaction between the magnetic field produced from stator core 15 and the magnetic field produced from permanent magnet 18 produces an attractive force and a repulsive force corresponding to their respective polarities of the magnetic fields. Rotor 12 rotates around rotor shaft 20 as a result of the interaction between the attractive force and the repulsive force.

Description is provided next of the motor drive device composed of hall elements 38, i.e., the position detecting sensors, and circuit components 31 mounted on circuit board 13.

Figure 4:
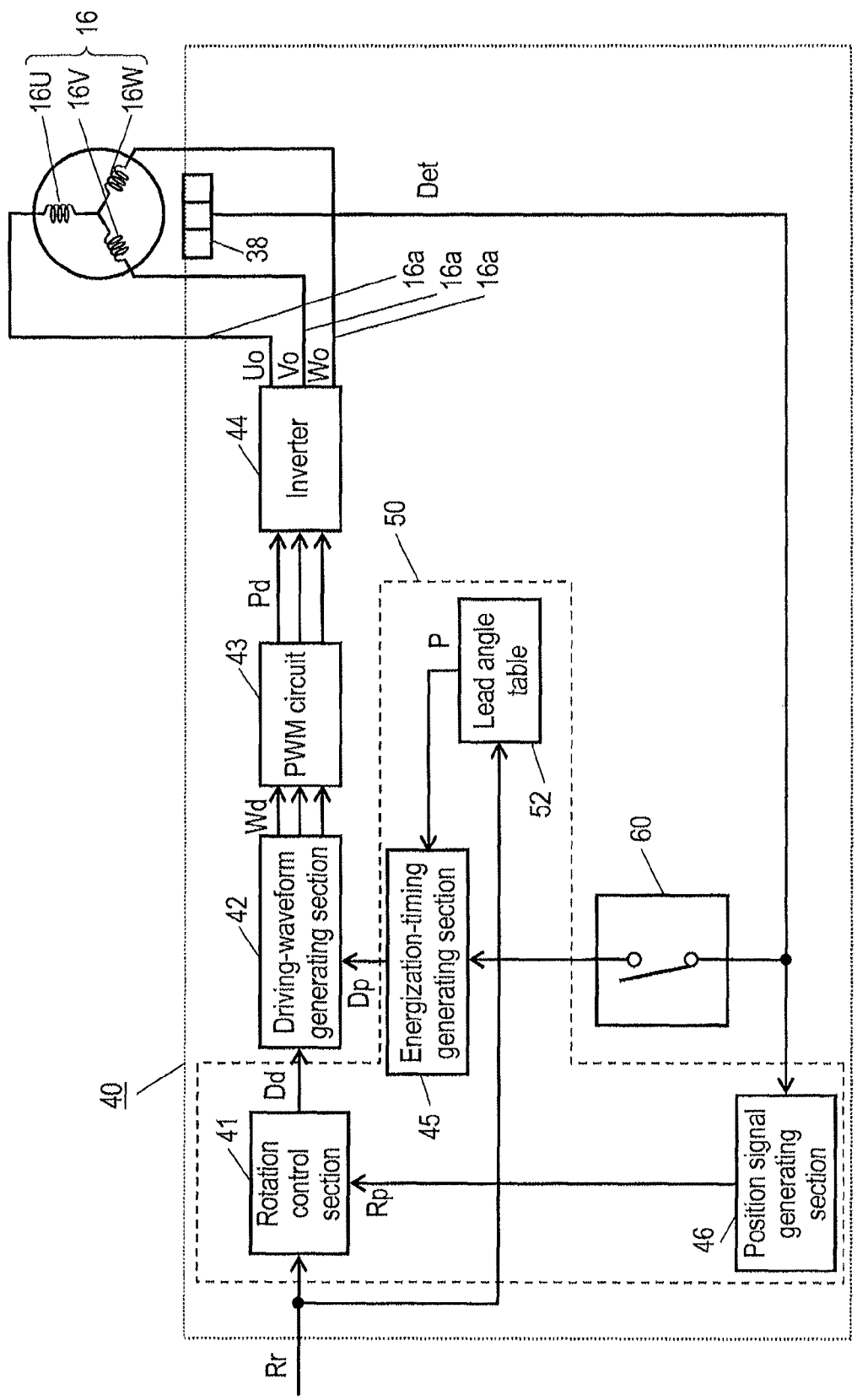
FIG. 4 is a block diagram of a motor drive device according to first exemplary embodiment of the present invention.

FIG. 4 is a block diagram showing a structure of the motor drive device for the brushless motor according to this exemplary embodiment.

Motor drive device 40 includes hall elements 38, or the position detecting sensors corresponding individually to the three phases, correction processing section 50, driving-waveform generating section 42, PWM circuit 43, inverter 44 and switch 60.

Correction processing section 50 performs a correction process of correcting a rotation speed of the rotor at the timing of receiving input of the position detection signals, and outputs a correction signal that informs execution of the correction process.

Switch 60 is connected between hall elements 38, i.e., the position detecting sensors, and correction processing section 50, and makes correction processing section 50 skip the correction process for a predetermined number of times by thinning out the position detection signals input in correction processing section 50.

Driving-waveform generating section 42 generates and supplies waveform signal Wd for driving windings 16 according to the correction signal.

PWM circuit 43 generates and supplies driving pulse signal Pd which is pulse-width modulated by waveform signal Wd.

Inverter 44 energizes windings 16 based on the driving pulse signal Pd.

Rotation command signal Rr for instructing a number of rotation per minute (rpm) for instance, as a target rotation speed that corresponds to a target rotation number of the rotor, is sent to motor drive device 40 from, for example, a higher-order unit acting as an outside host system.

Correction processing section 50 comprises rotation control section 41, energization-timing generating section 45, position signal generating section 46 and lead angle table 52.

Position signal generating section 46 detects an actual rotation speed at which the rotor actually rotates from position detection signals.

Rotation control section 41 controls a rotation speed of the rotor based on a deviation of the actual rotation speed detected in position signal generating section 46 from the target rotation speed directed by the host system.

Energization-timing generating section 45 generates an energization timing of a phase corresponding to a required degree of lead angle with respect to the position detection signal as reference timing. In addition, energization-timing generating section 45 supplies to driving-waveform generating section 42 an energization phase signal that indicates this energization timing.

Lead angle table 52 stores a required degree of lead angle in advance.

Description is given in more detail by referring to the drawing. Rotation command signal Rr is conveyed to rotation control section 41. Detected position signal Rp generated by position signal generating section 46 is also conveyed to rotation control section 41. Detected position signal Rp is basically a signal generated based on a detected result of the rotating position of the rotor. Rotation control signal Dd that indicates a driving amount for windings 16 is generated by rotation control section 41 based on rotation command signal Rr and detected position signal Rp.

To be concrete, in the first step, rotation control section 41 obtains a speed deviation from the detected speed calculated on the basis of rotation command signal Rr, which indicates the directed speed, and detected position signal Rp. The detected speed can be calculated from detected position signal Rp by using differentiation operation, and the like. In the next step, rotation control section 41 generates rotation control signal Dd that indicates an amount of torque corresponding to the speed deviation in order to make the actual speed become consistent with the directed speed. Rotation control section 41 then supplies the generated rotation control signal Dd to driving-waveform generating section 42.

Driving-waveform generating section 42 generates waveform signal Wd for each of the phases to drive windings 16. Driving-waveform generating section 42 supplies generated waveform signals Wd to PWM circuit 43. Waveform signals Wd become sinusoidal-wave signals when windings 16 are driven with sine waves. Waveform signals Wd become rectangular-wave signals when windings 16 are driven with rectangular waves. Amplitude of waveform signals Wd is determined according to rotation control signal Dd. The timing at which the waveform signals Wd is supplied to PWM circuit 43 is determined according to energization phase signal Dp delivered from energization-timing generating section 45. The timing corresponding to energization phase signal Dp becomes a so-called lead angle when the timing is on the leading side of phase relative to the reference timing. The timing corresponding to energization phase signal Dp becomes a so-called delay angle when the timing is on the delaying side of phase relative to the reference timing.

PWM circuit 43 pulse-width modulates waveform signals Wd for the individual phases supplied as the modulation signals from driving-waveform generating section 42 for individual phases. In other words, PWM circuit 43 executes pulse-width modulation of waveform signals Wd supplied to it. PWM circuit 43 then delivers to inverter 44 driving pulse signals Pd, which are signals of pulse trains generated as a result of the pulse-width modulation.

Inverter 44 drives windings 16 by supplying power to windings 16 for the individual phases based on driving pulse signals Pd. Inverter 44 comprises a switching element connected to a positive side of the power supply and another switching element connected to a negative side of the power supply for each of the U-phase, V-phase and W-phase. One end opposite to the power supply side of the switching element connected to the positive side of the power supply and one end opposite to the power supply side of the other switching element connected to the negative side of the power supply are connected together to form a point of junction. This point of junction is a driving output terminal of inverter 44 from which windings 16 are driven. Driving output terminal Uo of the U-phase is connected to winding 16U through lead wire 16a, driving output terminal Vo of the V-phase is connected to winding 16V through lead wire 16a. Driving output terminal Wo of the W-phase is connected to winding 16W through lead wire 16a.

The switching elements in each of the phases are turned on and off according to driving pulse signals Pd. During this operation, a driving current is supplied from one of the driving output terminals to corresponding one of windings 16 through the activated switching element among those switching elements connected to the positive side of the power supply. The driving current flowed through another of windings 16 to the corresponding one of the driving output terminals is delivered back to the activated switching element among those switching elements connected to the negative side of the power supply. Driving pulse signals Pd are the pulse-width modulated signals of waveform signals Wd. Driving currents corresponding to waveform signals Wd are thus supplied to the individual windings 16 by the above on-and-off operation of the individual switching elements.

With the structure described above, a feedback control loop is formed to control the rotation speed and rotating position of rotor 12 according to rotation command signal Rr.

Described next is a structure for generating detected position signal Rp and energization phase signal Dp.

First, hall elements 38 mounted on the circuit board detect changes in the magnetic polarities produced by the permanent magnet retained on the rotating rotor, and output position sensor signals Det that are referred to as the position detection signals, as indicated in FIG. 4. Position sensor signals Det are supplied to energization-timing generating section 45 through switch 60, and also supplied to position signal generating section 46. Position signal generating section 46 generates detected position signal Rp by using position sensor signals Det. Position signal generating section 46 supplies the generated detected position signal Rp to rotation control section 41.

Energization-timing generating section 45 uses a timing of receiving position sensor signals Det as to be a reference timing, and generates a timing of which phase is shifted by a given degree of lead angle from the reference timing. Energization-timing generating section 45 also receives lead-angle value P supplied from lead angle table 52, as an optimum lead angle for a rotating state of the brushless motor at a specific time. Energization-timing generating section 45 generates energization phase signal Dp that indicates the timing of which an angle is advanced by lead-angle value P from the reference timing. Energization phase signal Dp thus generated is supplied to driving-waveform generating section 42. In the manner as described above, driving-waveform generating section 42 outputs waveform signal Wd at the timing of which an angle is advanced by a value of energization phase signal Dp from the reference timing on the basis of position sensor signals Det. Lead angle table 52 stores lead-angle values P that correspond to rotation speeds (rpm), and that are optimum for such rotation speeds. Lead-angle values P stored in this embodiment are the values of lead angles that can make the motor current smallest at each of the rotation speeds.

Rotation command signal Rr is input to lead angle table 52. Lead angle table 52 reads out lead-angle value P corresponding to a rotation speed indicated by the received rotation command signal Rr. Lead angle table 52 then supplies the readout lead-angle value P to energization-timing generating section 45. As stated, correction processing section 50 corrects the rotation speed of the rotor to bring it into conformity with the target rotation speed by inputting position sensor signals Det to energization-timing generating section 45.

Description is provided here about operation and function of switch 60. Described first is operation of switch 60 in a state of connection, that is, when it stays turned on all the time.

In this exemplary embodiment, description provided below is an example wherein correction processing section 50 is composed of a microcomputer. Alternatively, correction processing section 50 may be composed of a structure capable of performing similar functions without using any microcomputers.

Position sensor signals Det output from hall elements 38 are input to correction processing section 50 composed of the microcomputer. In correction processing section 50, an interrupt process is carried out every time position sensor signals Det are input in correction processing section 50, and energization phase signal Dp is output from energization-timing generating section 45 to driving-waveform generating section 42. The correction process for the rotation speed of the rotor is thus executed based on the output energization phase signal Dp.

On the other hand, position sensor signals Det are not input to correction processing section 50 composed of the microcomputer when switch 60 is turned off. The interrupt process is not carried out in correction processing section 50 because position sensor signals Det are not input in correction processing section 50. The correction process for the rotation speed of the rotor is not executed since energization phase signal Dp is not generated and output in the absence of interrupt process. Position sensor signals Det generated periodically with rotation of the rotor and input to correction processing section 50 are thinned out in the above manner by switch 60. In other words, the correction process for the rotation speed of the rotor can be skipped by means of switch 60.

Hall elements 38 detect changes in the magnetic polarities caused by the permanent magnet retained on the rotating rotor, and output them as position sensor signals Det. In the brushless motor of this exemplary embodiment, the rotor retains the permanent magnet having five pairs of N-magnetic poles and S-magnetic poles disposed alternately for a total of ten magnetic poles, as discussed above. Therefore, individual hall elements 38 each outputs ten position sensor signals Det, which means totally thirty position sensor signals at regular time intervals every time that the rotor makes one rotation.

In other words, there occur thirty interrupt processes in the microcomputer each time the rotor makes one complete rotation, since none of the correction processes is skipped when switch 60 is kept always turned on.

On the other hand, some of position sensor signals Det generated periodically and input to correction processing section 50 can be thinned out according to a predetermined rule if switch 60 is turned on and off according to the predetermined rule. Therefore motor drive device 40 of this embodiment can hence skip some of the correction processes.

Switch 60 only needs to be capable of controlling position sensor signals Det input to correction processing section 50. Switch 60 may be either a mechanical switch or an electrical switch.

As discussed above, the rotor vibrates at a specific vibration frequency corresponding to a cyclic period of the correction processes for the rotation speed of the rotor, when the correction processes are executed periodically. As the rotor vibrates, noise occurs from the rotor at this specific vibration frequency.

Let Nc be a number of corrections per one rotation of the rotor, Np be a number of magnetic poles of the rotor, s be a number of hall elements 38 denoting the position detecting sensors, and Nr be rotation speed of the rotor (in rpm), then vibration frequency fv produced by the correction processes is given by the equation (1):

$$fv = Nc \times Nr/60 = Np \times s \times Nr/60 \qquad (1)$$

Let Ns be a number of skipped correction processes, then vibration frequency fv produced by the reduced correction processes is given by the equation (2):

$$fv = Np \times s/(1+Ns) \times Nr/60 \qquad (2)$$

FIG. 5 is a characteristic table showing the relation between numbers of correction processes Ns that are skipped and corresponding vibration frequencies resulting from the corrections in the brushless motor according to the present exemplary embodiment.

The brushless motor of this exemplary embodiment has Np=10 and s=3. Here, the vibration frequency fv becomes 300 Hz, 150 Hz, 100 Hz, - - - and 10 Hz as the number of skips Ns increases from 0 to 1, 2, - - - and 29 respectively, under a condition of Nr=600 rpm. In this embodiment, the correction is executed only once per each rotation in the mechanical angle of the rotor when the number of skips becomes 29. The vibration frequency produced by the correction processes does not vary so much when the mechanical angle of the rotor is not smaller than one rotation, even if the number of skips of the correction processes is increased. The number of skips of the correction processes is therefore set to 29 times at the maximum.

Figure 6:
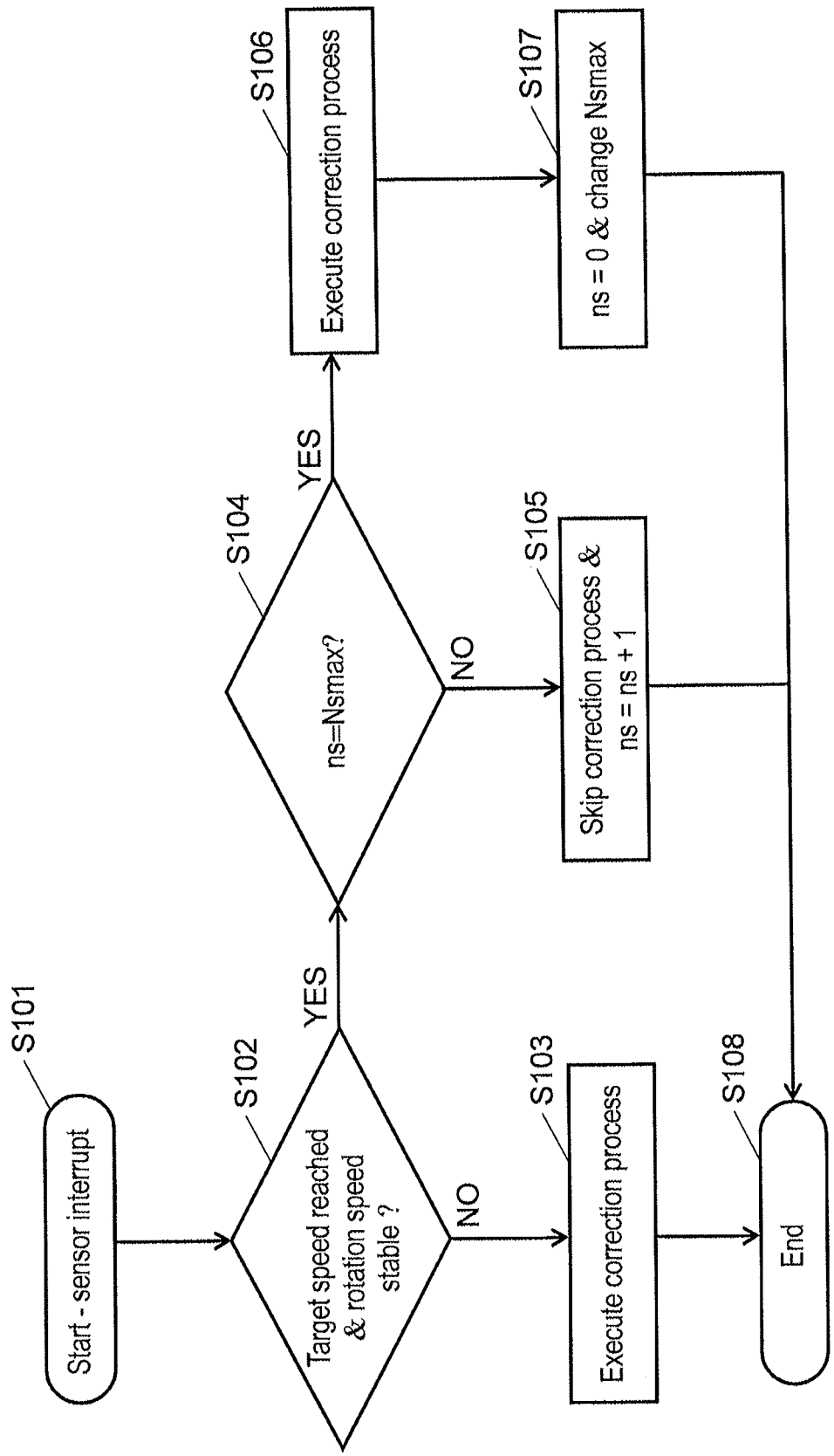
FIG. 6 is a flow chart showing a motor drive method according to first exemplary embodiment of the present invention.

FIG. 6 is a flow chart showing a driving method of the motor driving unit according to the present exemplary embodiment.

A motor drive method of this exemplary embodiment comprises skipping of correction process for a predetermined number of times when executing the correction process for the rotation speed of the rotor based on the position detection signals.

To be concrete, the first step is taken to determine whether or not the rotor has reached a target rotation speed, and the rotation speed of the rotor has come to stable (step S102).

The next step taken is to determine whether or not the number of times skipped has reached the maximum number of skips when the rotation speed has become stable (step S104).

The next step taken is to skip the correction process if the number of times skipped has not reached the maximum number of skips (step S105).

The next steps taken are to execute the correction process, and to change the maximum number of skips when the number of times skipped has reached the maximum number of skips (steps S106 and S107).

The maximum number of skips is changed within a range between not smaller than one time and not greater than (Np×s−1) times where Np denotes a number of the magnetic poles of the rotor, and s denotes a number of the position detecting sensors.

A method of changing the maximum number of skips is to decrease it by one time within the range from (Np×s−1) times to one time, every time the number of times skipped has reached the maximum number of skips.

Or, the method of changing the maximum number of skips is to increase it by one time within the range from one time to (Np×s−1) times, every time the number of times skipped has reached the maximum number of skips.

Or, another method of changing the maximum number of skips is to change the number at random within the range from one time to (Np×s−1) times, every time the number of times skipped has reached the maximum number of skips.

Description is given here in detail with reference to the drawing. First, assume that the maximum number of skips Nsmax (an integer of 0 to 29) is set to an initial value and the number of times skipped ns is reset (ns=0), as shown in FIG. 6, before the brushless motor starts operating.

Upon start of the sensor interruption (step S101) in the microcomputer that forms the correction processing section, determination is made as to whether or not the rotor has reached the target rotation speed, and the rotation speed of the rotor has become stable (step S102). The correction process for the rotation speed is executed (step S103) if the rotor has reached the target rotation speed, but the rotation speed has not become stable (NO in step S102), and the correction process of the correction processing section ends (step S108).

On the other hand, when the rotor has reached the target rotation speed and the rotation speed has become stable (YES in step S102), determination is then made as to whether or not the number of times skipped ns has reached the maximum number of skips Nsmax (step S104). If the number of times skipped ns has not reached the maximum number of skips Nsmax (NO in step S104), the correction process for the rotation speed is skipped and the number of times skipped ns is incremented (step S105), and the correction process of the correction processing section ends (step S108).

When the number of times skipped ns has reached the maximum number of skips Nsmax (YES in step S104), on the other hand, the correction process for the rotation speed is executed (step S106). Afterwards, the process is advanced to step S107, where the number of times skipped ns is reset, and a value of the maximum number of skips Nsmax is changed.

In this method, the maximum number of skips Nsmax may be changed by decreasing it by one time from 29 times, or by increasing it by one time from 0 time. Or, the number may be changed at random between 0 time and 29 times after the rotation speed of the rotor becomes stable. The correction process for the rotation speed is executed in the following manner, for instance, when consideration is given to the case in which the maximum number of skips Nsmax is changed by increasing it one by one from 0 to 29 times.

When the rotation speed of the rotor becomes stable, first, the correction process is executed once every sensor interruption (i.e., 0 in the number of skips). Next, the correction process is executed once for every two sensor interruptions (i.e., 1 in the number of skips). Next, the correction process is executed once for every three sensor interruptions (i.e., 2 in the number of skips). The number of skips is increased one by one in the above manner, and finally, the correction process is executed once every thirty sensor interruptions (i.e., 29 in the number of skips). These skipping operations of the correction processes are repeated.

The skipping operations of the correction processes described by using FIG. 6 has advantages, description of which is provided with reference to FIG. 7A and FIG. 7B. FIG. 7A and FIG. 7B are characteristics diagrams showing vibration frequencies attributed to the correction processes for the rotation speed of the rotor, or frequency characteristics of noises. FIG. 7A shows an example when a brushless motor is driven by a conventional motor drive method, and FIG. 7B shows another example when the brushless motor is driven by the motor drive method according to this exemplary embodiment. In the conventional method, the correction process is executed for every sensor interruption input to a microcomputer that forms a correction processing section, as shown in FIG. 7A. The vibration frequencies attributed to correction processes therefore concentrate around 300 Hz, as are calculated according to the expression (1) discussed above. As a result, noise of a large peak level exceeding a given threshold is produced at the frequency of 300 Hz due to the correction processes when the brushless motor rotates.

In the motor drive method of this exemplary embodiment, on the other hand, the vibration frequencies attributed to the correction processes are spread over a plurality of frequencies in proportion to the number of skips of the correction processes, as shown in FIG. 7B. In the case of no skipping of the correction process, indicated as "Noise when not skipped" in FIG. 7B, for instance, noise occurs at frequency of 300 Hz. Likewise, the noise occurs at frequency of 150 Hz when the correction process is skipped once, indicated as "Noise when skipped 1 time" in FIG. 7B. The noise occurs at frequency of 100 Hz when the correction process is skipped twice, indicated as "Noise when skipped 2 times" in FIG. 7B. The noise occurs at frequency of 10 Hz when the correction process is skipped twenty-nine times as a consequence of increase in the number of skips of the correction process.

The vibration frequencies produced by the correction processes for the rotation speed of the rotor are hence spread over thirty different frequencies without concentrating at any specific frequency. Noise levels of these individually spread vibration frequencies become below the given threshold throughout all the frequencies.

As described above, the brushless motor covered in the present invention comprises a rotor, a stator and a position detecting sensor.

The rotor includes a rotor shaft, a permanent magnet having N-magnetic poles and S-magnetic poles disposed alternately at regular intervals in a circumferential direction about an axis of rotation of the rotor shaft, and a bearing that supports the rotor shaft in a freely rotatable manner about the axis of rotation.

The stator includes a stator core having a plurality of protruding poles, and windings for individual phases wound around the stator core.

The position detecting sensor detects a rotating position of the rotor according to a change in the magnetic polarities produced by the permanent magnet, and outputs a position detection signal.

In a motor drive method of the present invention, a correction process is skipped for a predetermined number of times when executing the process of correcting a rotation speed of the rotor according to the position detection signal while driving such brushless motor.

A motor drive device related to the present invention comprises a correction processing section, a switch, a driving-waveform generating section, a PWM circuit and an inverter so as to drive such a brushless motor.

The correction processing section executes a correction process of correcting a rotation speed of a rotor at the timing of receiving input of position detection signals, and outputs a correction signal that informs execution of the correction process.

The switch is connected between the position detecting sensor and the correction processing section, and makes the correction processing section skip the correction process for a predetermined number of times by thinning out position detection signals input in the correction processing section.

The driving-waveform generating section generates and supplies a waveform signal for driving a winding according to the correction signal.

The PWM circuit generates and supplies a driving pulse signal which is pulse-width modulated by the waveform signal.

The inverter energizes the winding based on the driving pulse signal.

It becomes possible to spread vibration frequencies that occur due to correction processes for a rotation speed of the rotor, by skipping the correction processes with such a unit. As a result, a peak level of the noise hitherto produced at a specific frequency during rotation of the motor can be reduced.

The motor drive method of this exemplary embodiment, when used for controlling an air-cooling blower, can improve an audible level to operating sound of the air-cooling blower.

In addition, the correction processes of this exemplary embodiment can be achieved easily with a low-cost circuit, e.g. a microcomputer such as a 8 bit microcomputer, since this embodiment does not require complex processing.

In the above exemplary embodiment, some of the correction processes are skipped by thinning out position sensor signals Det (i.e., position detection signals) output from hall elements that are the position detecting sensors by using a hardware known as a switch.

A similar operation and function can be achieved by using software with a method below. That is, all of position sensor signals Det are input to a microcomputer that forms a correction processing section, and the correction processes are skipped with a software program while executing the correction processes with the correction processing section.

INDUSTRIAL APPLICABILITY

The motor drive method and the motor drive device of the present invention achieve stable rotation control of motors and reduction of noise with a simple structure. The motor drive method and the motor drive device of the invention are therefore suitable for fan motors and blowers for which low noises are especially needed. Besides, the motor drive method and the motor drive device of the invention are also useful for motors used in electrical apparatuses for which low noises are desired.

The invention claimed is:

1. A motor drive method for driving a brushless motor comprising:
   a rotor including a rotor shaft, a permanent magnet having N-magnetic poles and S-magnetic poles disposed alternately at regular intervals in a circumferential direction about an axis of the rotor shaft, and a bearing supporting the rotor shaft rotatably about the axis;
   a stator including a stator core having a plurality of protruding poles, and windings of individual phases wound around the stator core; and
   a position detecting sensor for detecting a rotating position of the rotor according to a change in magnetic polarities produced by the permanent magnet, and outputting a position detection signal,
   the motor drive method comprising the steps of:
      executing a correction process for correcting a rotation speed of the rotor according to the position detection signal; and
      the rotor reaches a target rotation speed and the rotation speed of the rotor has become stable, skipping the correction process for a predetermined number of times when executing the correction process.

2. The motor drive method of claim 1 further comprising the steps of:
   determining whether or not the rotor reaches a target rotation speed and the rotation speed of the rotor has become stable;
   determining whether or not a number of times skipped has reached a maximum number of skips when the rotation speed becomes stable;
   skipping the correction process when the number of times skipped does not reach the maximum number of skips; and
   executing the correction process and changing the maximum number of skips when the number of times reaches the maximum number of skips.

3. The motor drive method of claim 2, further comprising the step of changing the maximum number of skips within a range between one time and Np×s−1 times, where Np denotes a number of the magnetic poles of the rotor, and s denotes a number of the position detecting sensors.

4. The motor drive method of claim 3, wherein the maximum number of skips is decreased by one time within a range from Np×s−1 times to one time, every time the number of times skipped reaches the maximum number of skips.

5. The motor drive method of claim 3, wherein the maximum number of skips is increased by one time within a range from one time to Np×s−1 times, every time the number of times skipped reaches the maximum number of skips.

6. The motor drive method of claim 3, wherein the maximum number of skips is changed at random within a range from one time to Np×s−1 times, every time the number of times skipped has reached the maximum number of skips.

7. A motor drive device for driving a brushless motor having
   a rotor including a rotor shaft, a permanent magnet having N-magnetic poles and S-magnetic poles disposed alternately at regular intervals in a circumferential direction about an axis of the rotor shaft, and a bearing supporting the rotor shaft rotatably about the axis,
   a stator including a stator core having a plurality of protruding poles, and windings for individual phases wound around the stator core, and
   a position detecting sensor for detecting a rotating position of the rotor according to a change in magnetic polarities produced by the permanent magnet, and outputting a position detection signal,
   the motor drive device comprising:
   a correction processing section for executing a correction process for a rotation speed of the rotor at timing of receiving input of a position detection signal, and outputting a correction signal for informing the executing of the correction process;
   a switch connected between the position detecting sensor and the correction processing section, and for making the correction processing section skip the correction process for a predetermined number of times by thinning out the position detection signals input in the correction processing section;

a driving-waveform generating section for generating and supplying a waveform signal for driving the windings according to the correction signal;

a PWM circuit for generating and supplying a driving pulse signal which is pulse-width modulated by the waveform signal; and an inverter for energizing the windings based on the driving pulse signal.

8. The motor drive device of claim 7, further comprising a host system for directing a target rotation speed of the rotor provided in the brushless motor, wherein the correction processing section comprises:

a position signal generating section for detecting an actual rotation speed at which the rotor actually rotates from the position detection signal;

a rotation control section for controlling the rotation speed of the rotor based on a deviation of the actual rotation speed detected by the position signal generating section from the target rotation speed directed by the host system; and an energization-timing generating section for generating an energization timing of a phase corresponding to a required degree of lead angle with respect to the position detection signal as a reference timing, and supplying to the driving-waveform generating section an energization phase signal that indicates the energization timing.

9. The motor drive device of claim 8, further comprising a lead angle table storing the required degree of the lead angle in advance.

10. The motor drive device of claim 7, wherein the predetermined number of times is changed within a range between not less than one time and not greater than Np×s−1 times, where Np denotes a number of the magnetic poles of the rotor, and s denotes a number of the position detecting sensors.

* * * * *